(12) United States Patent
Liao et al.

(10) Patent No.: US 7,956,972 B2
(45) Date of Patent: Jun. 7, 2011

(54) LIQUID CRYSTAL ON SILICON DISPLAY PANEL WITH REDUCING FRINGE EFFECT

(75) Inventors: Bing-Jei Liao, Sinshih Township, Tainan County (TW); Kuan-Hsu Fan Chiang, Sinshih Township, Tainan County (TW); Teng-Kuei Wu, Sinshih Township, Tainan County (TW)

(73) Assignee: Himax Technologies Limited, Tainan (TW)

( * ) Notice: Subject to any disclaimer, the term of this patent is extended or adjusted under 35 U.S.C. 154(b) by 86 days.

(21) Appl. No.: 12/237,676

(22) Filed: Sep. 25, 2008

(65) Prior Publication Data

US 2009/0015742 A1 Jan. 15, 2009

Related U.S. Application Data

(63) Continuation-in-part of application No. 10/940,087, filed on Sep. 14, 2004, now abandoned.

(51) Int. Cl.
*G02F 1/1343* (2006.01)
*G02F 1/1335* (2006.01)

(52) U.S. Cl. .......... 349/139; 349/113; 349/137
(58) Field of Classification Search .......... 349/33, 349/43, 113, 137, 139
See application file for complete search history.

(56) References Cited

U.S. PATENT DOCUMENTS

| | | | |
|---|---|---|---|
| 5,416,619 A | 5/1995 | Koike | |
| 6,005,651 A | 12/1999 | Takahara et al. | |
| 6,567,149 B1 | 5/2003 | Yamaguchi et al. | |
| 6,628,355 B1 * | 9/2003 | Takahara | 349/106 |
| 6,795,144 B1 * | 9/2004 | Okuda et al. | 349/113 |
| 6,828,595 B2 | 12/2004 | Leng | |
| 2002/0118331 A1 * | 8/2002 | Sakamoto et al. | 349/141 |
| 2003/0197816 A1 | 10/2003 | Winer | |

OTHER PUBLICATIONS

Liao, et al,; Requirement for Restriction/Election, mailed Mar. 29, 2006, filed Sep. 14, 2004. U.S. Appl. No. 10/940,087.
Liao, et al,; Non-Final Office Action, mailed Jun. 16, 2006, filed Sep. 14, 2004. U.S. Appl. No. 10/940,087.
Liao, et al,; Final Office Action, mailed Nov. 21, 2006, filed Sep. 14, 2004. U.S. Appl. No. 10/940,087.
Liao, et al,; Non-Final Office Action, mailed May 2, 2007, filed Sep. 14, 2004. U.S. Appl. No. 10/940,087.
Liao, et al,; Final Office Action, mailed Oct. 18, 2007, filed Sep. 14, 2004. U.S. Appl. No. 10/940,087.
Liao, et al,; Non-Final Office Action, mailed Mar. 26, 2008, filing date Sep. 14, 2004. U.S. Appl. No. 10/940,087.

* cited by examiner

*Primary Examiner* — Nathanael R Briggs
(74) *Attorney, Agent, or Firm* — Thomas, Kayden, Horstemeyer & Risley, LLP

(57) ABSTRACT

A liquid crystal on silicon (LCOS) display panel with reducing fringe effect is provided herein. The liquid crystal on silicon display panel includes a common electrode, a semiconductor substrate having a plurality of pixel electrodes and control electrodes, a passivation layer on the pixel electrodes and a part of the semiconductor substrate, an anti-reflection coating (ARC) layers on the control electrodes, a transparent substrate on the semiconductor substrate, and a liquid crystal layer between the transparent substrate and the semiconductor substrate, wherein each of the control electrodes is disposed between and isolated with two adjacent ones of the pixel electrodes.

18 Claims, 13 Drawing Sheets

US 7,956,972 B2

LIQUID CRYSTAL ON SILICON DISPLAY PANEL WITH REDUCING FRINGE EFFECT

RELATED APPLICATIONS

This application is a continuation-in-part of U.S. application Ser. No. 10/940,087, filed on Sep. 14, 2004, which is herein incorporated by reference.

FIELD OF THE INVENTION

The present invention relates to a liquid crystal on silicon (LCOS) display panel, and more particularly, to an LCOS display panel with the reducing fringe effect.

BACKGROUND OF THE INVENTION

Nowadays, various kinds of digital projector are commercially available, such as liquid crystal display (LCD) projectors, digital light processing (DLP) projectors, and liquid crystal on silicon (LCOS) projectors. The LCD projector operates in a transmissive way, with the light beam directly passing through the imaging device and lens. The DLP projector and the LCOS projector operate in a reflective way, with the light beam of high brightness being reflected by the imaging device before passing through the lens.

The LCOS display is a key technique of the reflective LC projectors and rear-projection TVs. The most favorable advantages of the LCOS display panel are low production cost and high resolution. In comparison to a typical LCD panel, the upper and lower substrates of the LCD panel are glass while the upper substrate of the LCOS panel is glass and the lower substrate is mainly a semiconductor material, silicon. Therefore, manufacture of the LCOS display panel involves techniques of the typical LCD panel and complementary metal-oxide semiconductor (CMOS) processes.

Reference is made to FIG. 1, which depicts a cross-sectional structure of the LCOS display panel in the prior art. Typically, the structure of the LCOS display panel in the prior art includes a parallel pair of a semiconductor substrate 101 and a transparent substrate 121, wherein an active array of transistor circuitry (not shown) is fabricated by the CMOS process and disposed in the semiconductor substrate 101. Pixel electrodes 103 and a passivation layer 111 are disposed on the semiconductor substrate 101, in turn, wherein the pixel electrodes 103 are smooth mirrors with high reflectivity, and the passivation layer 111 prevents the pixel electrodes 103 from being damaged. At least one common electrode 123 is disposed on a surface of the transparent substrate 121 with respect to the pixel electrodes 103 of the semiconductor substrate 101, wherein the common electrode 123 is a transparent conductive layer. A liquid crystal layer 125 is formed between the transparent substrate 121 and the semiconductor substrate 101. Ideally, the transistor circuit generates only a vertical electric field 130 between each pixel electrode 103 and the common electrode 123, whereby an LC molecule 126 tilts to a desired angle.

However, the transistor circuit in practice also generates a lateral electric field 140 between the neighboring pixel electrodes 103. The LC molecules 126 located between the neighboring pixel electrodes 103 are affected by both electric fields 130 and 140, and do not tilt to the desired angle. Such a fringe effect causes light leakage between the neighboring pixel electrodes 103 and seriously reduces the contrast of the image projected on the screen.

SUMMARY OF THE INVENTION

The object of the present invention is to provide an LCOS display device, an LCOS display panel with a reducing fringe effect. Control electrodes are formed between two adjacent pixel electrodes. Each control electrode is covered by an anti-reflection coating layer and receives a certain voltage to suppress the unwanted lateral electric field. The anti-reflection coating layers are formed without using any reticle additional to those used in the conventional process. Therefore, the light leakage resulting from the fringe effect in the conventional LCOS display panel is greatly reduced without significant increase of production cost.

The present invention provides a liquid crystal on silicon (LCOS) display panel, including a common electrode, a semiconductor substrate having a plurality of pixel electrodes and control electrodes, a passivation layer on the pixel electrodes and a part of the semiconductor substrate, anti-reflection coating (ARC) layers on the control electrodes, a transparent substrate on the semiconductor substrate, and a liquid crystal layer between the transparent substrate and the semiconductor substrate, wherein each of the control electrodes is disposed between and isolated with at least two adjacent ones of the pixel electrodes, each of the pixel electrodes receives a pixel voltage and each of the control electrodes receives a certain voltage which is determined in accordance with the received pixel voltages of the adjacent pixel electrodes, and wherein the common electrode is disposed on a surface of the transparent substrate with respect to the pixel electrodes of the semiconductor substrate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, the drawings illustrate embodiments of the invention and serve to explain the principles of the invention.

DETAILED DESCRIPTION OF THE PREFERRED EMBODIMENT

Hereinafter, the detailed description with respect to the method for reducing fringe effect of an LCOS display panel and the method of manufacturing an LCOS display panel are illustrated in conjunction with FIGS. 2 to 7B.

Figure 1:
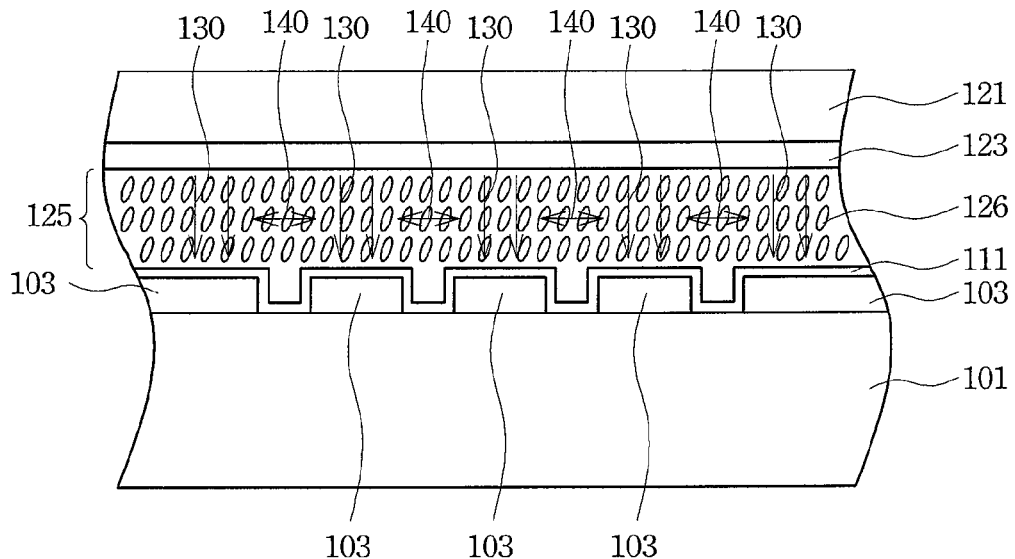
FIG. 1 depicts a cross-sectional structure of the LCOS display panel in the prior art.
Figure 2:
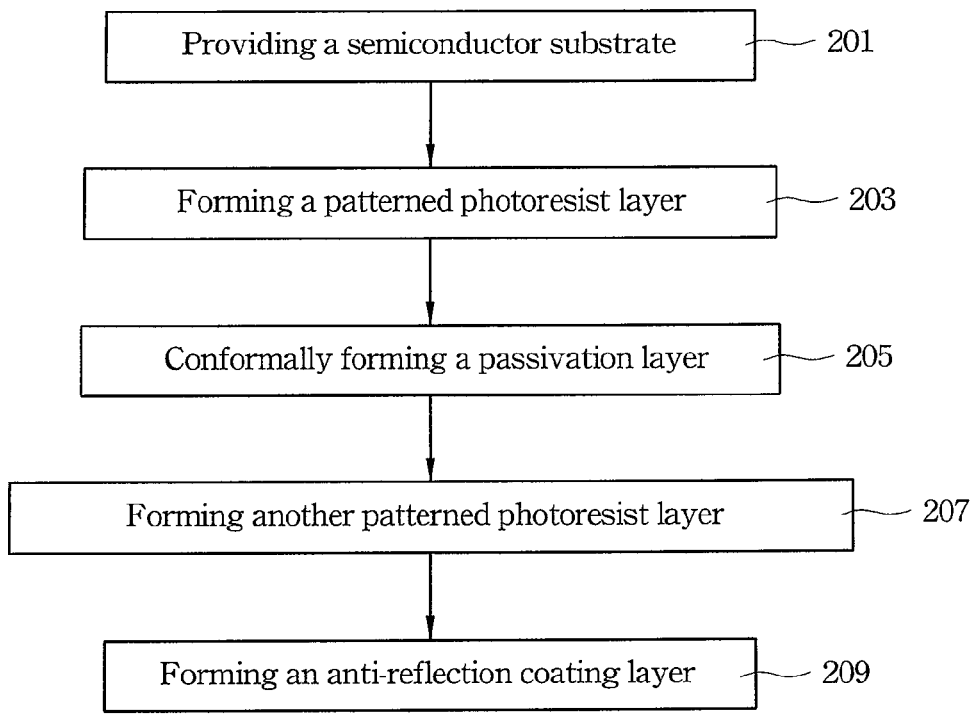
FIG. 2 depicts a flow chart of the method for reducing fringe effect of an LCOS display panel according to an exemplary embodiment of the present invention.

Reference is made to FIG. 2, which depicts a flow chart of the method for reducing fringe effect of an LCOS display panel according to an exemplary embodiment of the present invention; and to FIGS. 3A to 3G, which depict cross-sectional views of the process of reducing fringe effect of an LCOS display panel according to an exemplary embodiment of the present invention. As illustrated in the step 201 and FIG. 3A, a semiconductor substrate 301 is provided. The semiconductor substrate 301 has a surface 301a and a plurality of pixel electrodes 303 disposed thereon.

A control electrode 305 is disposed between two adjacent pixel electrodes 303 and receives a certain voltage to suppress the lateral electric field. The certain voltage is determined in accordance with voltages applied to the adjacent pixel electrodes 303. Furthermore, the control electrode 305 is isolated with the two adjacent pixel electrodes 303, and the control electrode 305 is deposited on the same level of the pixel electrodes 303, which means that the control electrodes 305 and the pixel electrodes 303 can be simultaneously formed on the semiconductor substrate 301 during one process step using a reticle. The control electrode 305 is much smaller than the pixel electrodes 303 in size so as to avoid reduction of the aperture ratio of the pixels. In an exemplary embodiment of the present invention, the pixel electrodes 303 and the control electrodes 305 are smooth mirrors with high reflectivity, and a material of the pixel electrodes 303 and the control electrodes 305 is a light-reflective metallic material such as aluminum.

Figure 3A:
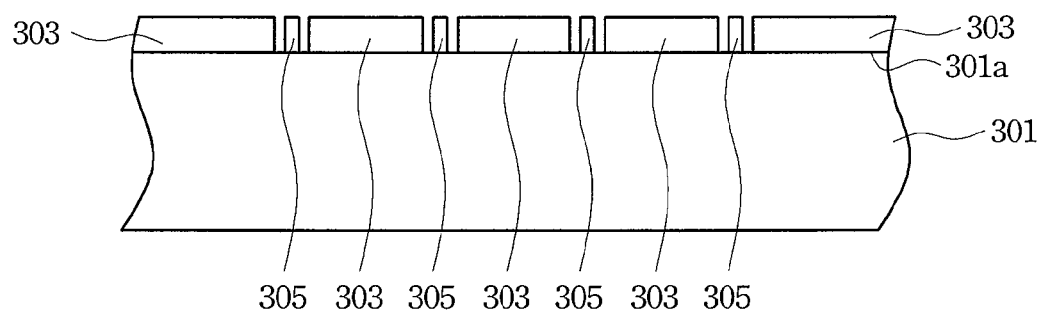
FIGS. 3A to 3G depict cross-sectional views of the process steps of reducing fringe effect of an LCOS display panel according to an exemplary embodiment of the present invention.
Figure 3B:
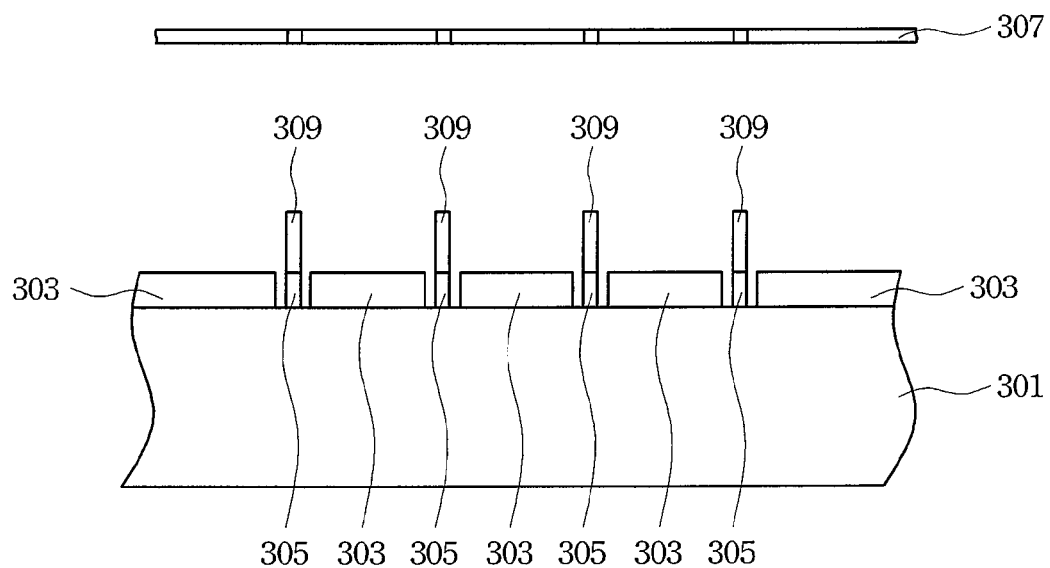
Figure 3C:
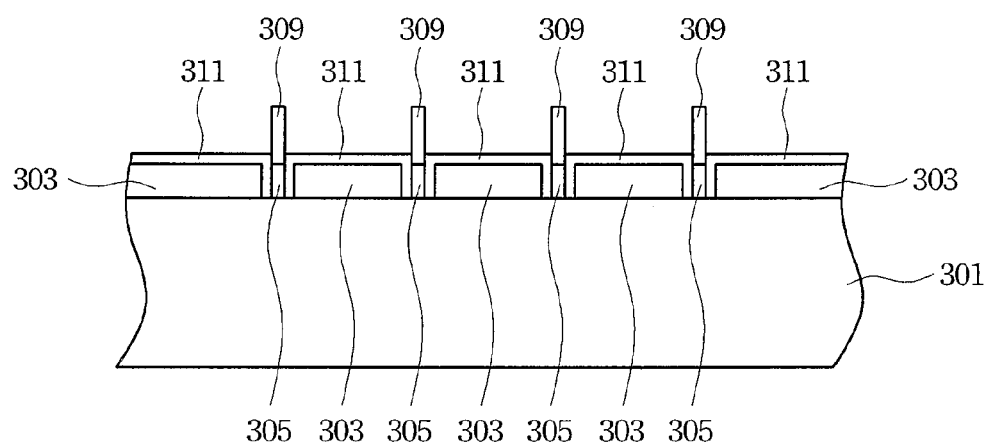

Next, a patterned photoresist layer 309 is formed on the control electrodes 305 by using a reticle 307 for exposing the pixel electrodes 303 and a part of the semiconductor substrate 301, as illustrated in the step 203 and FIG. 3B. A passivation layer 311 is then conformally formed on the outer surface of the pixel electrodes 303 and the part of the semiconductor substrate 301, so as to prevent the pixel electrodes 303 from being damaged. As illustrated in the step 205 and FIG. 3C, the control electrode is positioned between two adjacent pixel electrodes 303. The gaps between the control electrode 305 and the adjacent pixel electrodes 303 are filled with material of the passivation layer 311. In an exemplary embodiment of the present invention, a material of the passivation layer 311 is a dielectric material.

Figure 3D:
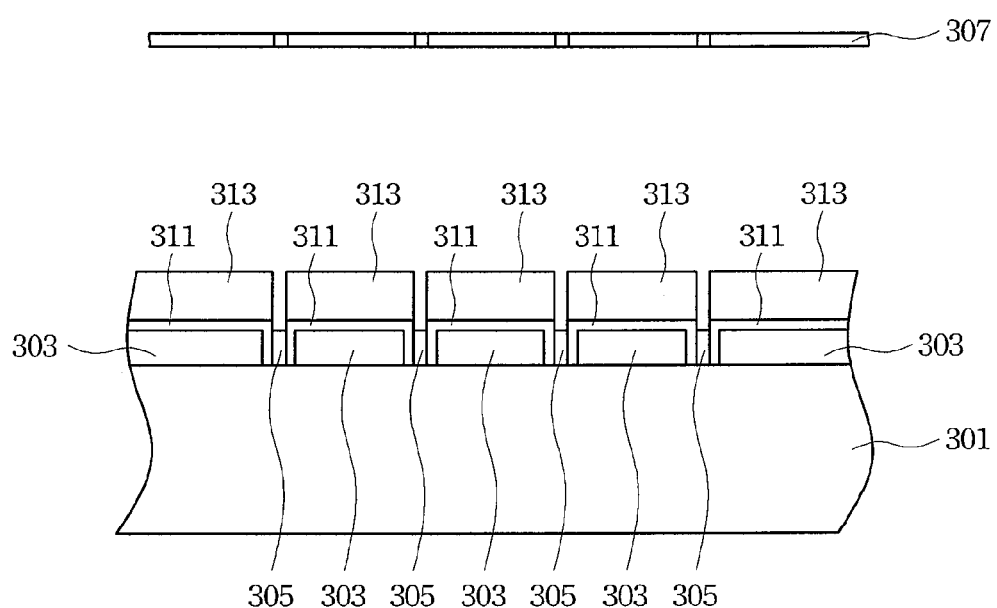

After removing the photoresist layer 309, as illustrated in the step 207 and FIG. 3D, another patterned photoresist layer 313 is formed on the passivation layer 311 by using the reticle 307 in the step 203, for exposing the control electrodes 305 and another part (not shown) of the semiconductor substrate 301 where an opening of a peripheral connection wiring is to be formed. It is worth mentioning that coating the control electrodes 305 with an anti-reflection layer can be achieved by using different reticles with complementary patterns. However, in the exemplary embodiment of the present invention, the control electrodes 305 and the opening of the peripheral connection wiring are respectively exposed and formed by using only the single reticle 307, which avoids increase of the reticles used, thereby the production cost reduced, by the CMOS process.

In an exemplary embodiment of the present invention, the photoresist layers 309 and 313 are respectively a positive and negative photoresist. Alternatively, in other embodiments of the present invention, the photoresist layers 309 and 313 are respectively a negative and positive photoresist. As is understood by a person skilled in the art, the foregoing reticle 307, the types of photoresist layer 309 and photoresist layer 313 are dependent on the requirement of the process and the design of the reticle pattern, rather than being limited by the scope of the present invention.

Figure 3E:
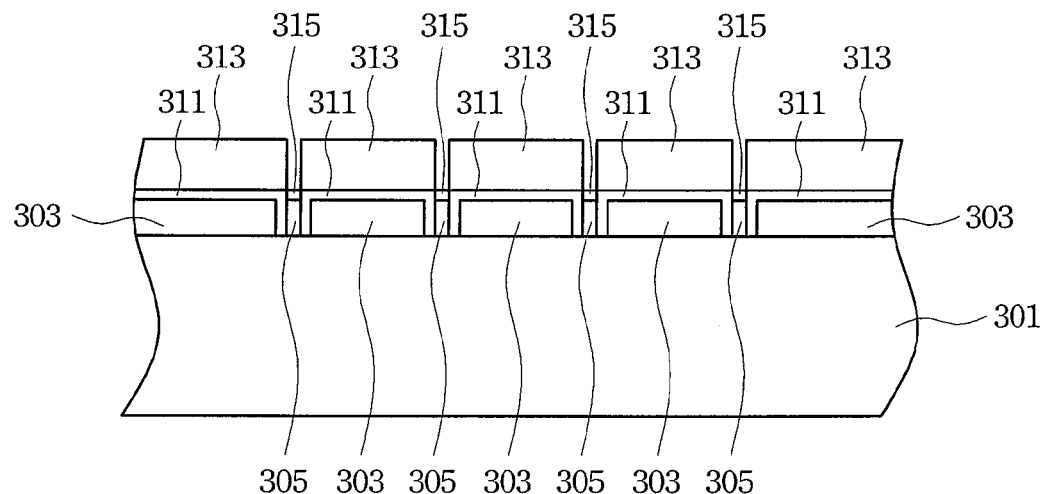

Afterwards, as illustrated in the step 209 and FIG. 3E, an anti-reflection coating (ARC) layer 315 is formed on the control electrodes 305. A material of the ARC layer 315 is preferably, but not limited to, titanium nitride (TiN). The ARC layer 315 prevents light from being projected onto the highly reflective surface of the control electrodes 305. The light reflectivity of the ARC layer 315 is lower than 20% of the light reflectivity of the control electrodes 305 so that the coated control electrodes act as black matrices and significantly reduce the light leakage.

Figure 3F:
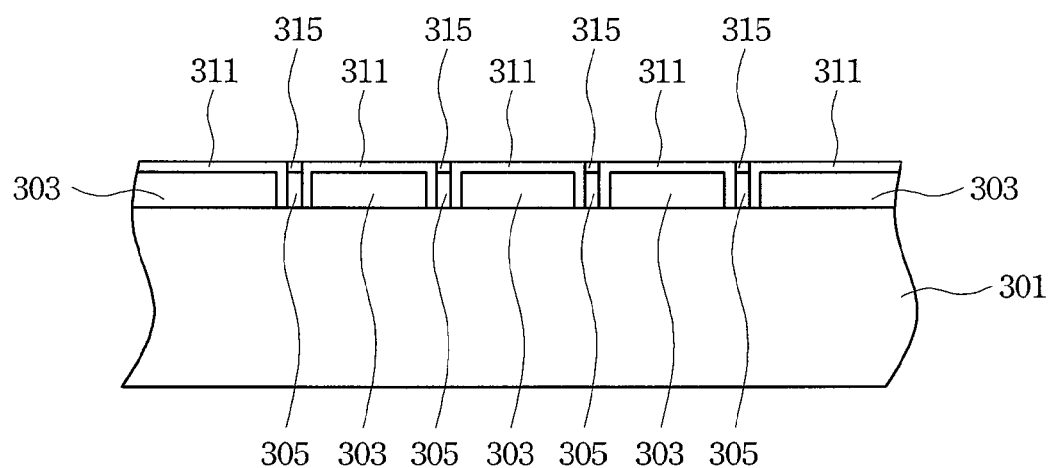
Figure 3G:
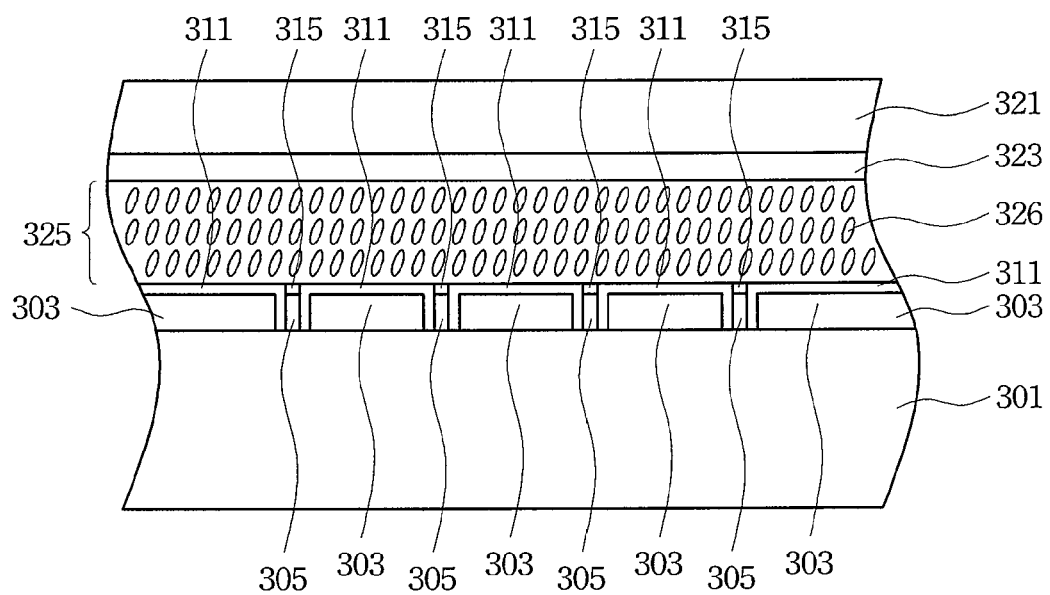

As illustrated in FIG. 3F, the photoresist layer 313 is removed, which is followed by a subsequent process of the LCOS display panel shown in FIG. 3G. A peripheral connection wiring (not shown) is formed on the other part of the semiconductor substrate 301. A transparent substrate 321, such as a glass substrate, is placed on the semiconductor substrate 301, wherein at least one common electrode 323 is disposed on a surface of the transparent substrate 321 with respect to the pixel electrodes 303 of the semiconductor substrate 301. Each of the control electrodes 305 is disposed between and, in a direction towards the common electrode 323, isolated with the two adjacent ones of the pixel electrodes 303, such that when the certain voltage is applied to the control electrodes 305, the lateral electric field is thus sufficiently suppressed. The common electrode 323 is a transparent conductive layer, and a material of the transparent conductive layer is, for example, indium tin oxide (ITO) or indium zinc oxide (IZO). A liquid crystal layer 325 is then formed between the transparent substrate 321 and the semiconductor substrate 301.

In brief, the present invention provides a method for reducing fringe effect of an LCOS display panel. Control electrodes 305 are formed between two adjacent pixel electrodes 303, each of which is covered by an anti-reflection coating layer and receives a certain voltage determined in accordance with voltages applied to the two adjacent ones of the pixel electrodes 303 to suppress the unwanted lateral electric field. The anti-reflection coating layers are formed without using any reticle additional to those used in the conventional process. Therefore, the light leakage resulting from the fringe effect in the conventional LCOS display panel is greatly reduced without significant increase of production cost.

Figure 4A:
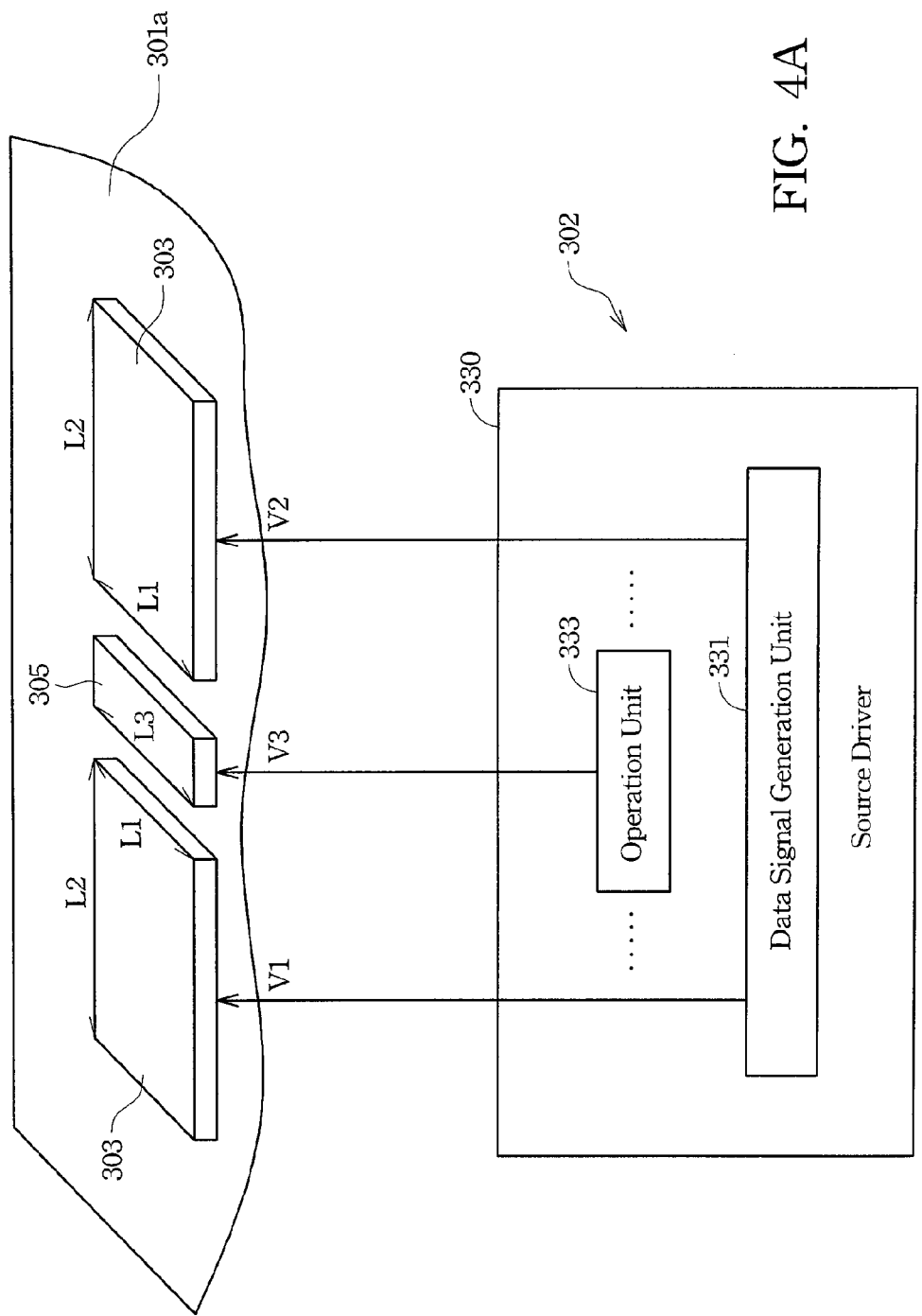
FIG. 4A depicts a schematic diagram of one arrangement and electrical connection of the pixel electrodes and the control electrode according to an exemplary embodiment of the present invention.

FIG. 4A depicts a schematic diagram of one arrangement and electrical connection of the pixel electrodes and the control electrode according to an embodiment of the present invention. Two adjacent pixel electrodes 303 are in a form of a parallelogram with two edge lengths L1 and L2, and the control electrode 305 deposited therebetween has a stripe-shaped with an edge length L3 neighbored with the edge length L1 of the pixel electrodes 303. In the exemplary arrangement, the edge length L3 of the control electrode 305 is about the same with the edge lengths L1. As shown in FIG. 4A, the adjacent two pixel electrodes 303 respectively receive pixel voltages V1, V2 for displaying corresponding image. With respect to the received pixel voltages V1, V2, the adjacent two pixel electrodes 303 also generate the lateral electric field therebetween. The LC molecules located between the adjacent two pixel electrodes 303 are affected by the lateral electric fields, and do not tilt to the desired angle. When a certain voltage V3 is applied to the control electrode 305, fringe effect caused by the lateral electric fields is sufficiently reduced. That is, the electric field located over the control electrode 305 can be adjusted to drive the LC molecules to tilt to the desired angle considering rotation angles of LC molecules on the adjacent pixel electrodes to prevent light leakage and improve display quality consequentially.

For detailed description, the following exemplary embodiments will describe how to provide the certain voltage V3 to the control electrode 305 according to the present invention. Referring to FIG. 4A and FIG. 3A through 3F, the pixel electrodes 303 and the control electrode 305 are disposed on the surface 301a of the semiconductor substrate 301. In addition, the semiconductor substrate 301 further comprises a circuitry 302 for correspondingly controlling the pixel electrodes 303 and the control electrode 305. In the present embodiment, the circuitry 302 can be a source driver 330 comprising a data signal generation unit 331 and an operation unit 333, which are capable of respectively providing pixel voltages V1, V2 and certain voltage V3 to the two adjacent pixel electrodes 303 and the control electrode 305. The certain voltage V3 is determined in accordance with the pixel voltages V1 and V2 for suppressing the generated lateral electric field thereof. The operation unit 333 can be integrated in the source driver and generates the certain voltage V3 by some operation methods. However, the magnitude of the certain voltage V3 should be adjusted considering the shape of the control electrode 305 and an overall structure of the LCOS display panel.

Figure 4B:
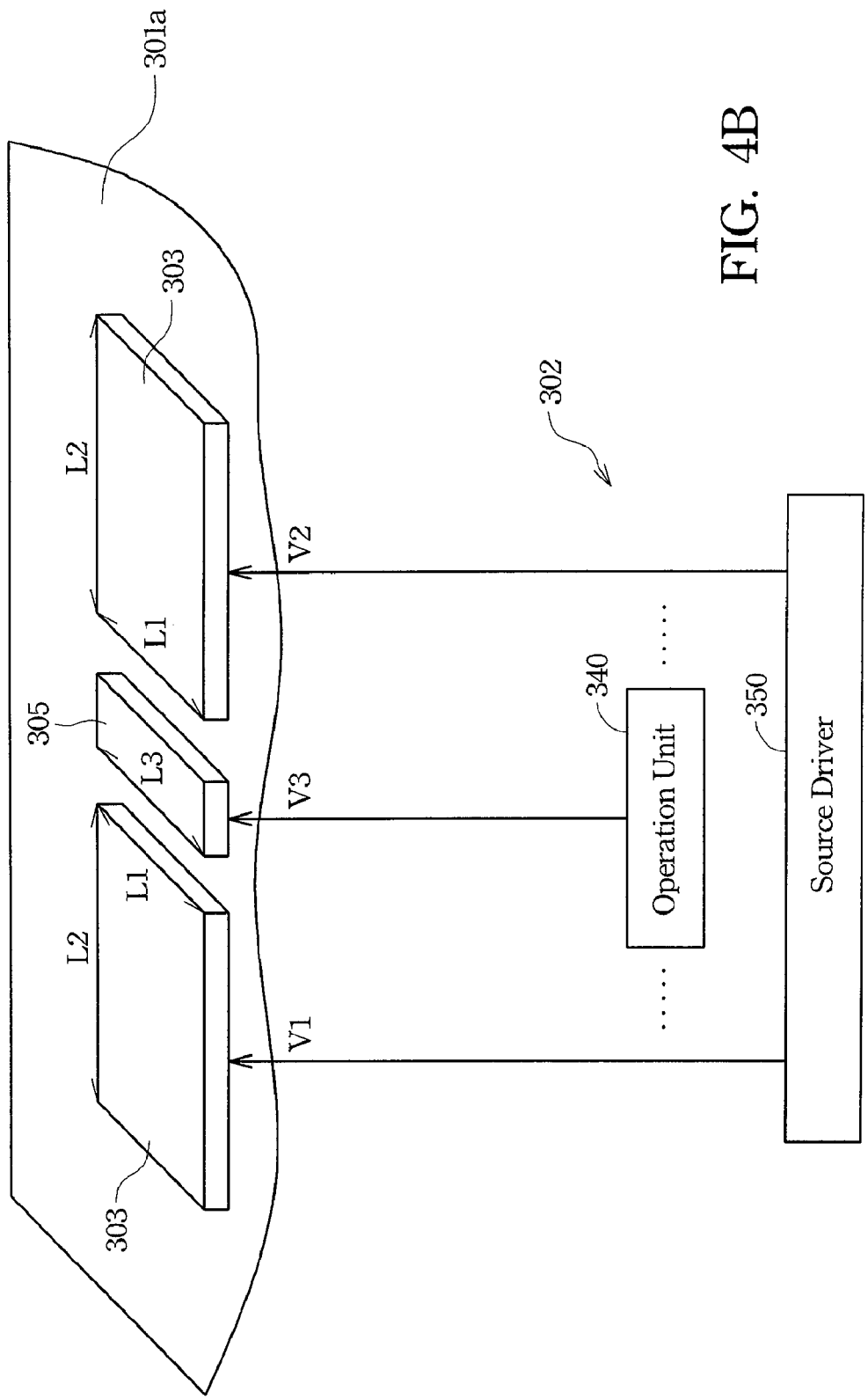
FIG. 4B depicts a schematic diagram of another electrical connections of the pixel electrodes and the control electrode according to an exemplary embodiment of the present invention.

The certain voltage V3 can be provided by another operation unit 340, as illustrated in FIG. 4B, which depicts a schematic diagram of another electrical connection of the pixel electrodes and the control electrode according to an exemplary embodiment of the present invention. The difference between the electrical connections shown in FIG. 4A and FIG. 4B is the operation unit 340 configured outside the source driver 350. The operation unit 340 can be another separate circuitry for generating the certain voltage V3. In the embodiment of the present invention, the operation unit 340 can be connected with the two adjacent pixel electrodes 303, so as to receive voltages V1 and V2 and generate the certain voltage V3.

With reference to FIGS. 4A and 4B, the operation methods for generating the certain voltage V3 associated with the pixel voltages V1, V2 can be represented by some equations, e.g. V3=A*V1+B*V2, where A and B are both rational numbers. For example, if A=½, and B=½, then V3=V1/2+V2/2. The rational numbers A and B are determined in accordance with structures of the pixel electrodes 303 and control electrode 305. Several arrangements of the pixel electrodes and control electrodes on the LCOS display panel of the present invention will be described hereinafter with reference to the attached figures.

Figure 5A:
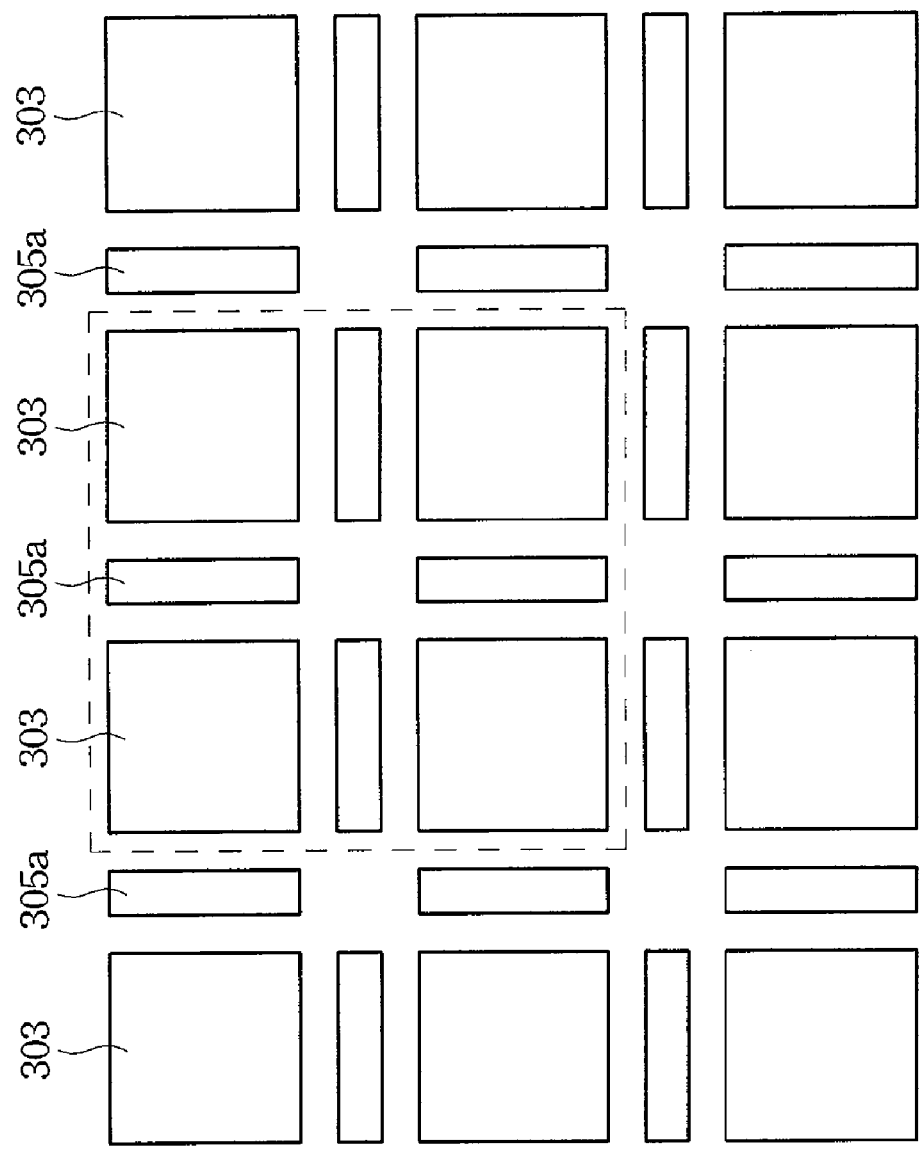
FIG. 5A depicts a top view of an LCOS display panel with a first arrangement of the pixel electrodes and the control electrodes according to an exemplary embodiment the present invention.
Figure 5B:
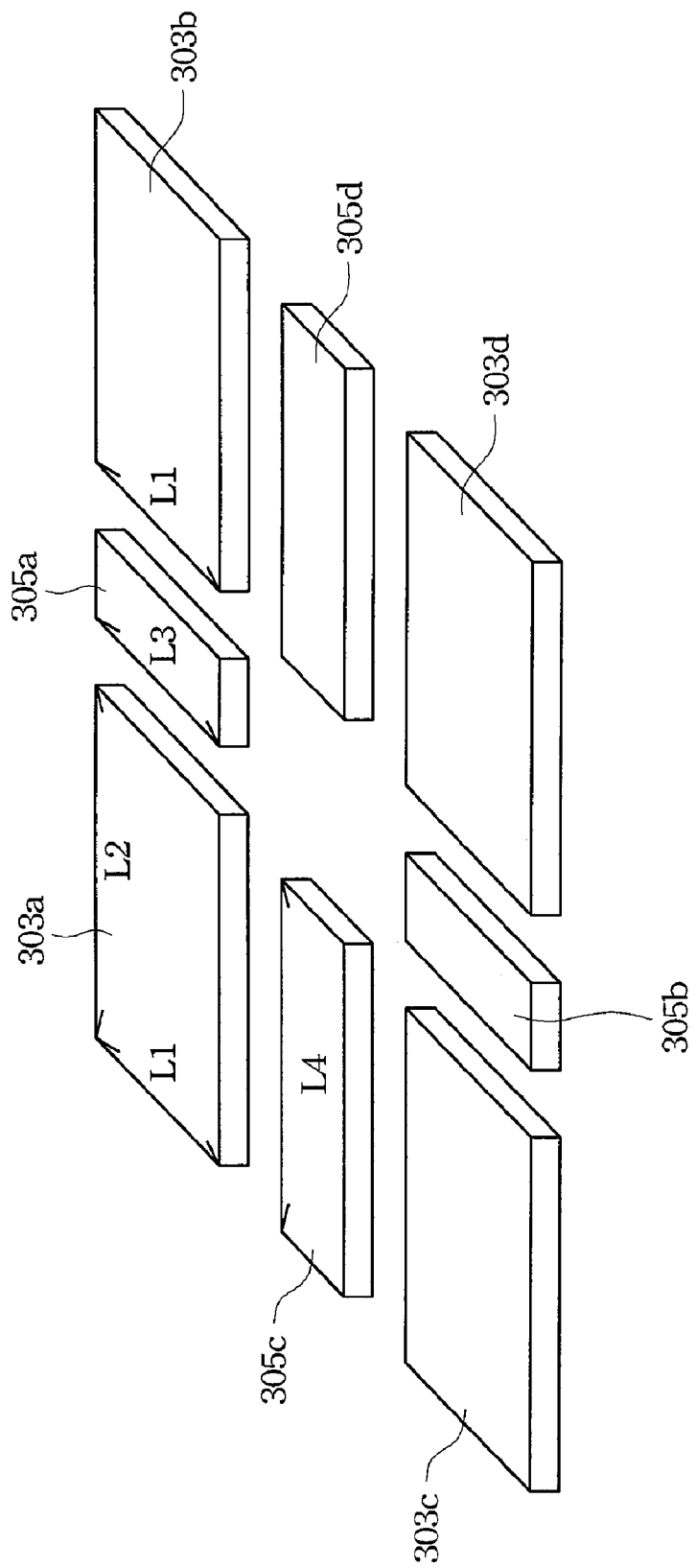
FIG. 5B depicts a three dimensional view of the area surrounded by dotted lines in FIG. 5A.

FIG. 5A depicts a top view of an LCOS display panel with an exemplary arrangement according to the present invention. FIG. 5B depicts a three dimensional view of the area surrounded by dotted lines in FIG. 5A. As illustrated in the step 205 and FIG. 3C, plurality of gaps are formed between adjacent two ones of the pixel electrodes on the semiconductor substrate. Refer to FIGS. 5A and 5B, pixel electrodes are arranged in an array, and control electrodes 305a, 305b, 305c, 305d are respectively deposited between two adjacent pixel electrodes. Each of the control electrodes 305a, 305b, 305c, and 305d is in the form of a stripe-shaped in the embodiment. Each of the control electrodes 305a, 305b, 305c, and 305d is positioned in one of the gaps and isolated from each other. The neighboring edges of the control electrodes can be about the same with the pixel electrodes. To describe further, as shown in FIG. 5B, edge lengths L3 of the control electrode 305a is about equal to the edge lengths L1 of the adjacent pixel electrodes 303a and 303b, and the edge lengths L4 of the control electrodes 305c is about equal to the edge lengths L2 of the adjacent pixel electrodes 303a and 303c. As mentioned before, each of the control electrodes 305a, 305b, 305c, 305d receives a certain voltage for suppressing the lateral electric field generated by the two adjacent pixel electrodes. In the embodiment, control electrode 305a receives a certain voltage in accordance with the pixel voltages applied to the adjacent pixel electrodes 303a and 303b, and control electrode 305c receives a certain voltage in accordance with the pixel voltages applied to the adjacent pixel electrodes 303a and 303c. As a result, with such arrangement and proper voltage applied to the control electrodes, the lateral electric fields between the adjacent pixel electrodes can be sufficiently reduced.

Figure 6A:
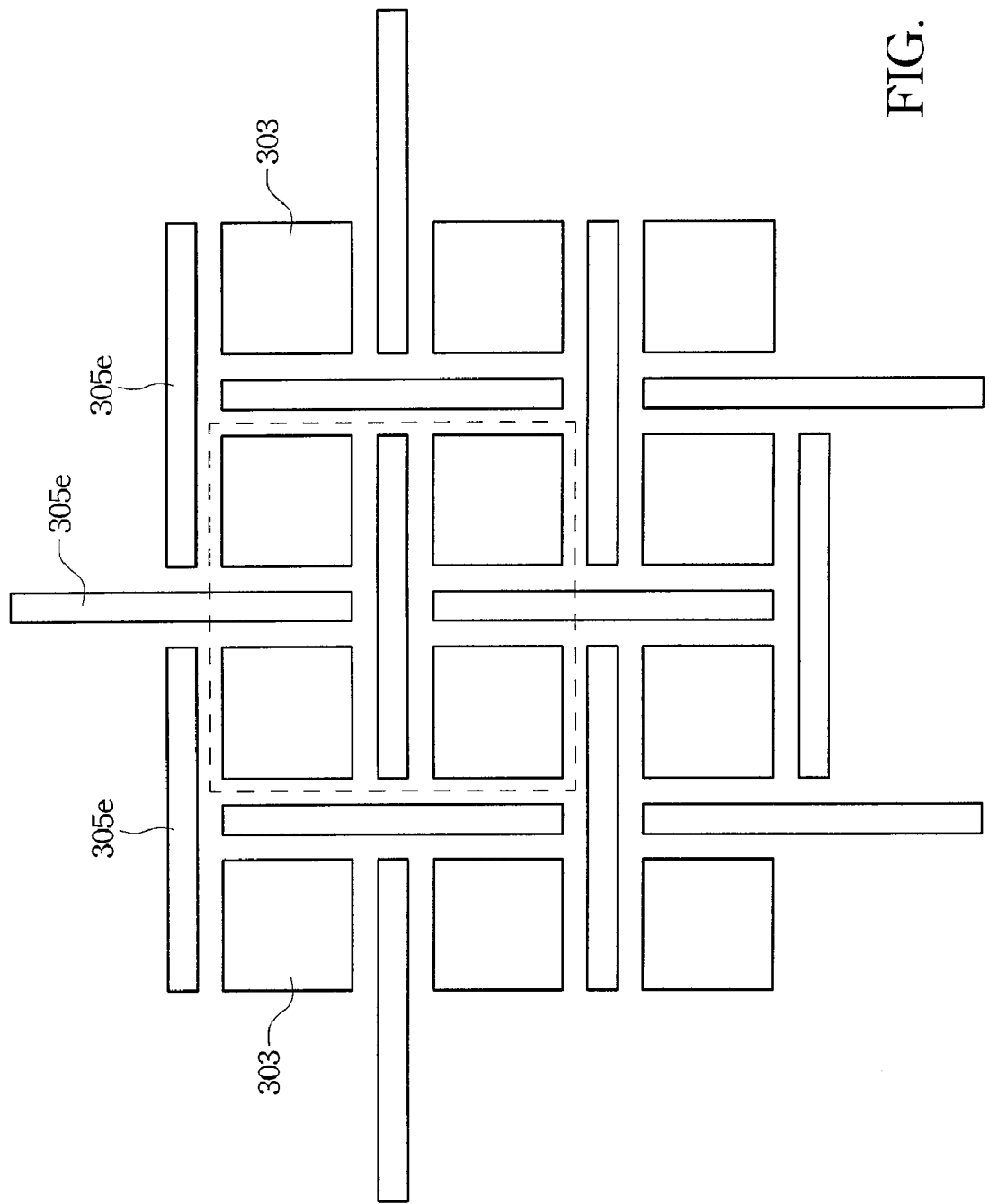
FIG. 6A depicts a top view of an LCOS display panel with another exemplary arrangement according to the present invention.
Figure 6B:
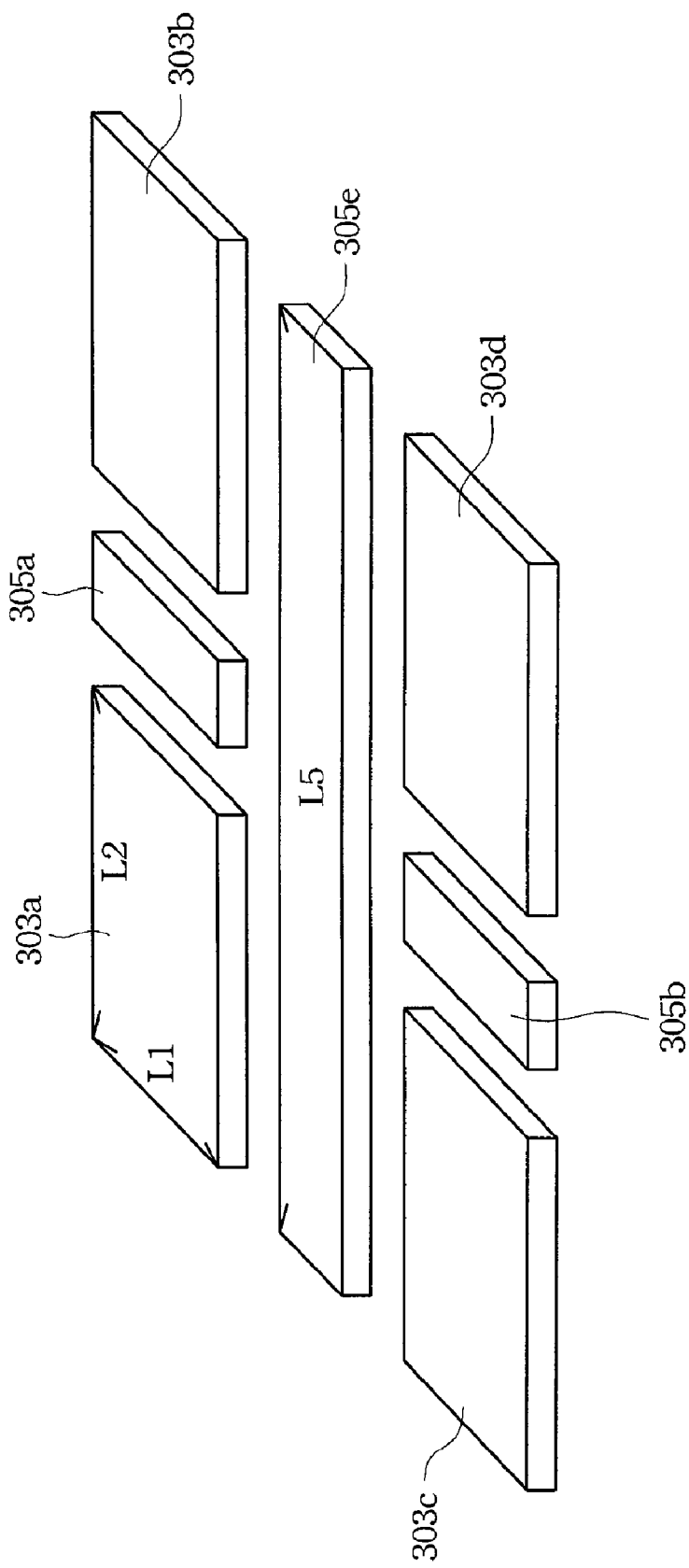
FIG. 6B depicts a three dimensional view of the area surrounded by dotted lines in FIG. 6A.

FIG. 6A depicts a top view of an LCOS display panel with another exemplary arrangement according to the present invention. FIG. 6B depicts a three dimensional view of the area surrounded by dotted lines in FIG. 6A. The difference between FIG. 6B and FIG. 5B is the shapes of the control electrodes. Refer to FIGS. 6A and 6B, the pixel electrodes 303 are arranged in an array. Control electrodes 305e is deposited between pixel electrodes 303a and 303c, and also between the pixel electrodes 303b and 303d. The control electrode 305e is in the form of a stripe-shaped as well as the previous embodiment, except an edge length L5 of the control electrode 305e is longer than twice of the edge length L2 of the pixel electrode 303a-303d, as illustrated in the FIG. 6B. In this embodiment, the control electrode 305e receives a certain voltage in accordance with the pixel voltages applied to the adjacent pixel electrodes 303a, 303b, 303c, 303d. The operation method for generating the certain voltage associated with the pixel voltages applied to the pixel electrodes 303a, 303b, 303c, 303d can be represented by some equations, e.g. $V_{certain}=A*Va+B*Vb+C*Vc+D*Vd$, where $V_{certain}$ represents the received certain voltage, V1 through V4 represent the pixel voltages applied to the corresponding pixel electrodes, and A, B, C, D are rational numbers. For example, if A=¼, B=¼, C=¼, and D=¼, then $V_{certain}=Va/4+Vb/4+Vc/4+Vd/4$. The present equation and the rational numbers can be adjusted in accordance with structures of the pixel electrodes and should not limit to the invention. With the voltage determined in accordance with the voltages applied to the four adjacent pixel electrodes, the control electrodes 305e can significantly suppress the lateral electric effect.

Figure 7A:
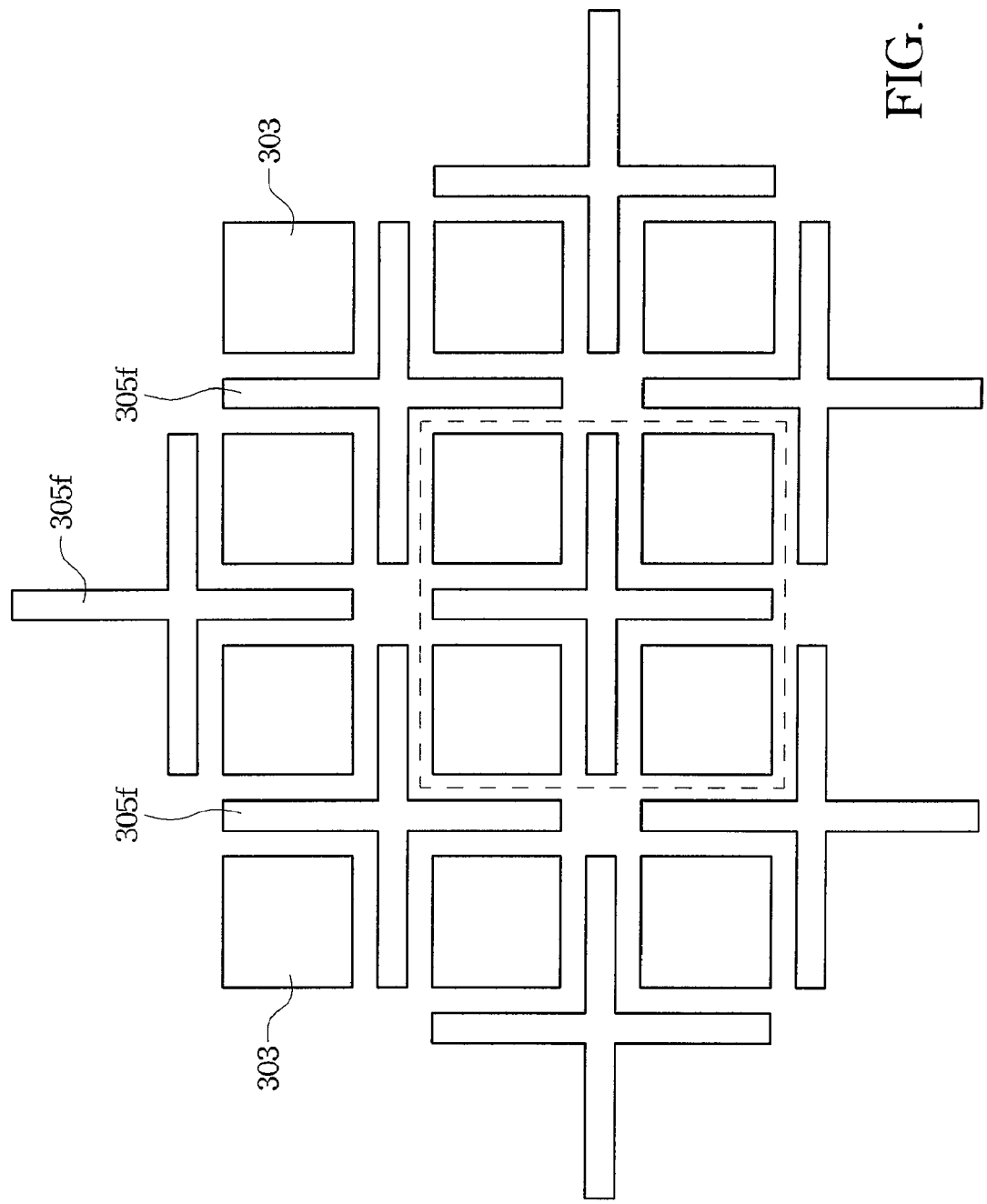
FIG. 7A depicts a top view of an LCOS display panel with another exemplary arrangement according to the present invention.
Figure 7B:
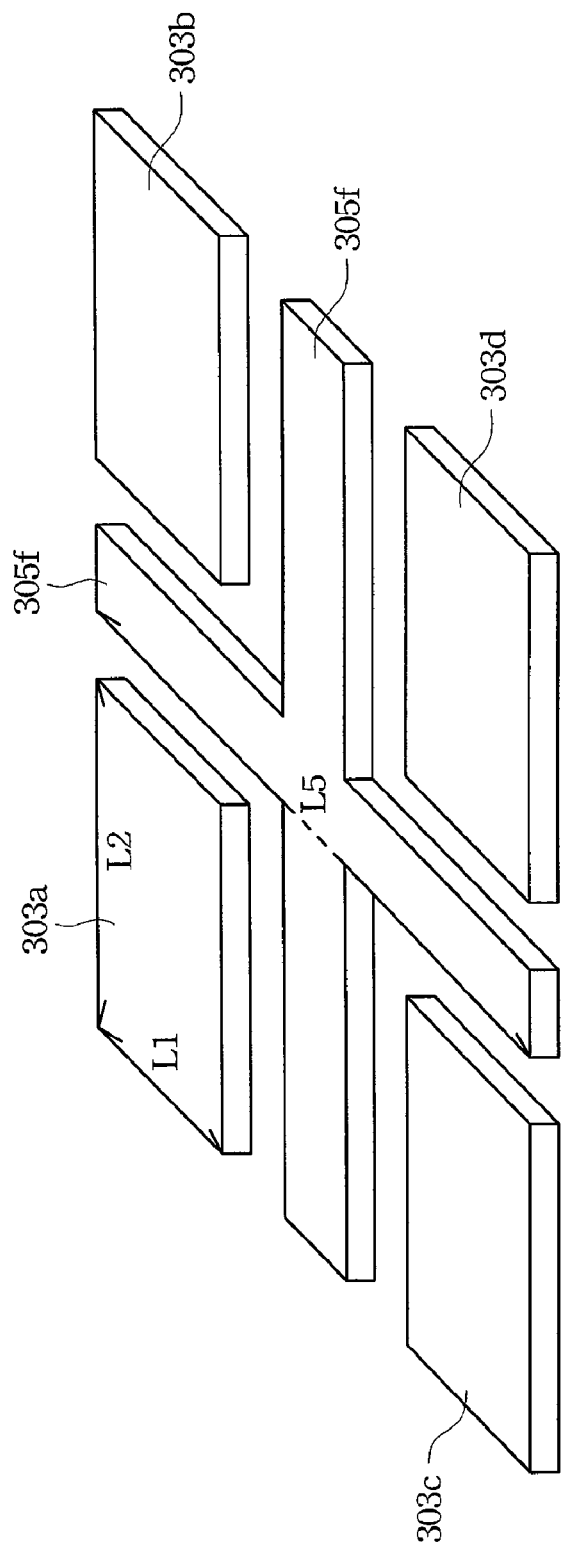
FIG. 7B depicts a three dimensional view of the area surrounded by dotted lines in FIG. 7A.

FIG. 7A depicts a top view of an LCOS display panel with another exemplary arrangement according to the present invention. FIG. 7B depicts a three dimensional view of the area surrounded by dotted lines in FIG. 7A. The difference between FIG. 7B and the aforesaid embodiment is the shape of the control electrodes. Refer to FIGS. 7A and 7B, the pixel electrodes 303 are arranged in an array and control electrode 305f is deposited between pixel electrodes 303a, 303b, 303c, 303d. The control electrode 305f is in the form of a cross-shaped with two branches. Each of the branches has an edge length longer than twice of the edge length of the adjacent pixel electrodes. As illustrated in FIG. 7B, the branch with edge length L5 is longer than twice of the edge length L1 of the pixel electrodes. In this embodiment, voltage applied to the control electrode 305f is determined in accordance with voltages applied to the pixel electrodes 303a, 303b, 303c, 303d. The operation method for generating the certain voltage can be the same with aforementioned embodiments and should not limit to the invention. With proper voltage applied to the control electrodes, the lateral electric fields between the adjacent pixel electrodes can be sufficiently reduced and improve the display quality accordingly.

As is understood by a person skilled in the art, the foregoing exemplary embodiments of the present invention are illustrated of the present invention rather than limiting of the present invention. The present invention is intended to cover various modifications and similar arrangements included within the spirit and scope of the appended claims, the scope of which should be accorded the broadest interpretation so as to encompass all such modifications and similar structure.

What is claimed is:

1. A liquid crystal on silicon (LCOS) display panel comprising:
   a transparent substrate, wherein a common electrode is disposed on a surface of the transparent substrate;
   a semiconductor substrate, wherein a plurality of pixel electrodes and control electrodes are disposed on a surface of the semiconductor substrate with respect to the common electrode, wherein each of the control electrodes is disposed between and isolated with two adjacent ones of the pixel electrodes, each of the pixel electrodes receives a pixel voltage and each of the control electrodes receives a certain voltage which is determined in accordance with the received pixel voltages of the adjacent pixel electrodes, wherein an electric field is generated by the common electrode and the control electrodes to tilt liquid crystal molecules between the control electrodes and the common electrode;
   a passivation layer on the pixel electrodes and a part of the semiconductor substrate;
   anti-reflection coating (ARC) layers on the control electrodes; and
   a liquid crystal layer between the transparent substrate and the semiconductor substrate.

2. The liquid crystal on silicon (LCOS) display panel as claimed in claim 1, wherein the control electrodes are on the same level of the pixel electrodes.

3. The liquid crystal on silicon (LCOS) display panel as claimed in claim 1, wherein each of the control electrodes has a stripe-shaped.

4. The liquid crystal on silicon (LCOS) display panel as claimed in claim 3, wherein an edge of the control electrodes has about the same length with a neighboring edge of the pixel electrodes.

5. The liquid crystal on silicon (LCOS) display panel as claimed in claim 3, wherein an edge of the control electrodes is longer than twice the length of a neighboring edge of the pixel electrodes.

6. The liquid crystal on silicon (LCOS) display panel as claimed in claim 3, wherein each of the control electrodes has a cross-shaped.

7. The liquid crystal on silicon (LCOS) display panel as claimed in claim 1, wherein the passivation layer for preventing the pixel electrodes from being damaged is conformal with the pixel electrodes.

8. The liquid crystal on silicon (LCOS) display panel as claimed in claim 1, wherein a material of the pixel electrodes and control electrodes is a light-reflective metallic material.

9. The liquid crystal on silicon (LCOS) display panel as claimed in claim 8, wherein the light-reflective metallic material is aluminum.

10. The liquid crystal on silicon (LCOS) display panel as claimed in claim 1, wherein a material of the passivation layer is a dielectric material.

11. The liquid crystal on silicon (LCOS) display panel as claimed in claim 1, wherein a material of the ARC layer is TiN.

12. The liquid crystal on silicon (LCOS) display panel as claimed in claim 1, wherein a material of the transparent substrate is glass.

13. The liquid crystal on silicon (LCOS) display panel as claimed in claim 1, wherein the common electrode is a transparent conductive layer.

14. The liquid crystal on silicon (LCOS) display panel as claimed in claim 13, wherein a material of the transparent conductive layer is selected from the group consisting of indium tin oxide (ITO) and indium zinc oxide (IZO).

15. The liquid crystal on silicon (LCOS) display panel as claimed in claim 1, wherein the semiconductor substrate further comprises a circuitry for correspondingly controlling the pixel electrodes and the control electrodes.

16. The liquid crystal on silicon (LCOS) display panel as claimed in claim 15, wherein the circuitry comprises a data signal generation unit and an operation unit for respectively providing the pixel voltages and the certain voltages to the pixel electrodes and the control electrodes.

17. The liquid crystal on silicon (LCOS) display panel as claimed in claim 1, wherein the certain voltages are adjustable in considering the shape of the control electrodes.

18. The liquid crystal on silicon (LCOS) display panel as claimed in claim 1, wherein the determined certain voltage is an average of the received pixel voltages of the adjacent pixel electrodes.

* * * * *